(12) United States Patent
Chang et al.

(10) Patent No.: US 7,804,562 B2
(45) Date of Patent: Sep. 28, 2010

(54) LIQUID CRYSTAL PANEL WITH A UNIFORM BACKGROUND COLOR

(75) Inventors: Kuei-Lin Chang, Taichung (TW); Ying-Chi Wang, Changhua Hsien (TW)

(73) Assignee: Wintek Corporation, Taichung Hsien (TW)

( * ) Notice: Subject to any disclaimer, the term of this patent is extended or adjusted under 35 U.S.C. 154(b) by 261 days.

(21) Appl. No.: 11/941,965

(22) Filed: Nov. 18, 2007

(65) Prior Publication Data

US 2008/0117368 A1 May 22, 2008

(30) Foreign Application Priority Data

Nov. 21, 2006 (TW) ............................. 95142969 A (51) Int. Cl.
*G02F 1/1335* (2006.01)

(52) U.S. Cl. ..................... 349/106; 349/110; 349/114

(58) Field of Classification Search ................ 349/106, 349/110, 114, 113

See application file for complete search history.

(56) References Cited

U.S. PATENT DOCUMENTS

| 6,573,960 B2 * | 6/2003 | Kobayashi et al. ......... 349/113 |
| 7,623,205 B2 * | 11/2009 | Kim ........................... 349/114 |

* cited by examiner

*Primary Examiner*—Thoi V Duong
(74) *Attorney, Agent, or Firm*—Muncy, Geissler, Olds & Lowe, PLLC (57) ABSTRACT

A liquid crystal panel with a uniform background color has a pixel region that actually generates images on the liquid crystal panel and is defined as an active area. Another region that does not generate images is defined as a viewing area. A black matrix in the viewing area has multiple windows so that the viewing area and the active area have the same or similar reflection regions. Therefore, the liquid crystal panel has a uniform background color.

14 Claims, 6 Drawing Sheets

FIG.10

LIQUID CRYSTAL PANEL WITH A UNIFORM BACKGROUND COLOR

BACKGROUND OF THE INVENTION

1. Field of the Invention

The invention relates to a liquid crystal panel and, in particular, to a reflective or transflective liquid crystal panel with a uniform background color.

2. Description of Related Art

Because of rapid developments in the semiconductor technology, semiconductor products are widely used in daily life. For example, liquid crystal display (LCD) is very common in all kinds of electronic products such as liquid crystal televisions, computer displays, hand-held game players, mobile phones and audio/video (A/V) equipment. The early active LCD uses a backlight module to be light source. The brightness of pixels of the LCD is completely determined by the strength of the backlight source. Later on, reflective type LCD and transflective type LCD are developed. The reflective type LCD uses a reflecting layer to reflect light from external environment emitting into the liquid crystal panel. However, the reflective type LCD must rely on sufficient environment light to produce clear images. To overcome this problem, the transflective LCD is invented. The light source of the transflective LCD for generating images can come from either the external environment or a backlight module.

Figure 8:
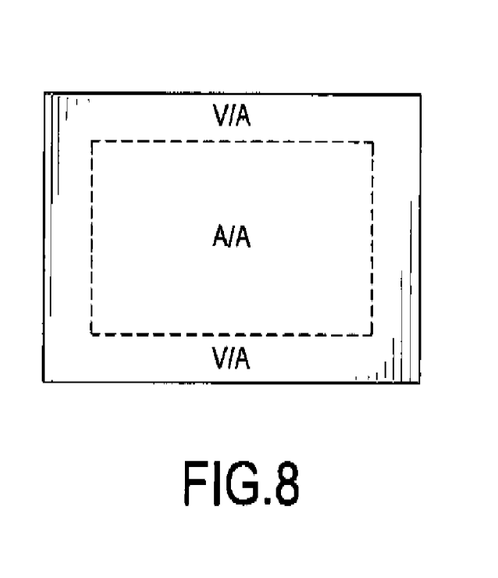
FIG. 8 is a schematic planar view of a conventional liquid crystal panel.
Figure 9:
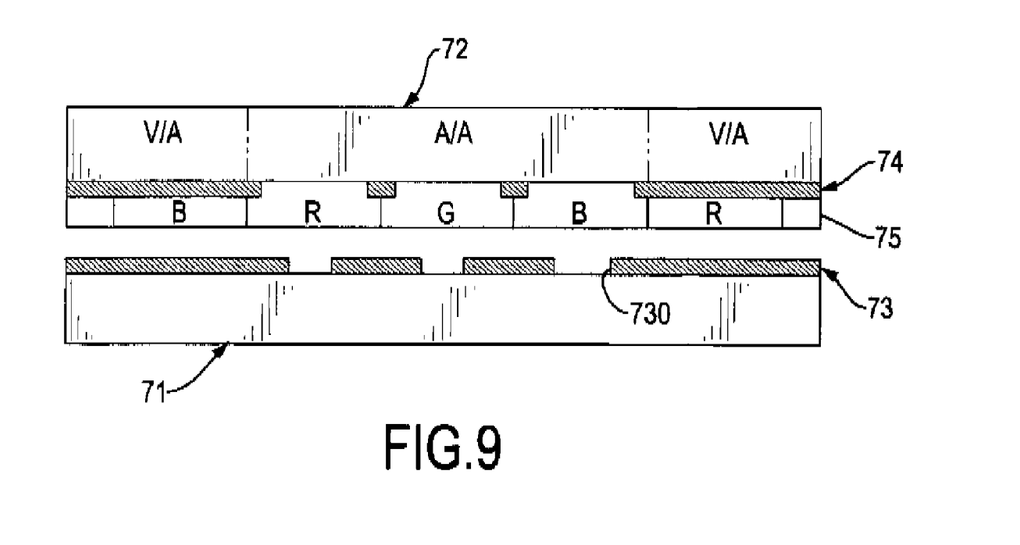
FIG. 9 is a partial cross-sectional view of a conventional liquid crystal panel.

In the aspect of display screen, both the reflective and transflective LCD's have a so-called active area (A/A) and viewing area (V/A). With reference to FIG. 8, the A/A refers to a region that can actually generate images and is located in a central part of the entire display screen and occupies a larger area. The V/A refers to a region that does not really produce images and surrounds the A/A. In the aspect of the structure, the A/A and the V/A are very similar to each other. With reference to FIG. 9, a partial cross-sectional view of a transflective liquid crystal panel is shown. The transflective liquid crystal panel includes a first substrate (71) and a second substrate (72) that are disposed opposite to each other, and separated to form an appropriate gap filled with liquid crystal (not shown).

A top surface of the first substrate (71) is formed with a reflective layer (73) made of metal material. The reflective layer (73) has an opening (730) at each pixel unit in the A/A. The lights from the backlight can pass through the openings (730). The pixel unit is a basic component of a pixel. Normally, each pixel consists of three pixel units (R, G, and B).

An inner surface of the second substrate (72) facing the first substrate (71) is formed with a black matrix (BM) (74) and a color filter (C/F) layer (75). The C/F layer (75) has different colors (red, green, and blue) for different pixel units (R, G, and B), respectively. The BM (74) within the A/A is just formed among adjacent colors of the C/F layer (75). The BM (74) within the V/A totally covers the C/F layer (75) in that region.

Figure 10:
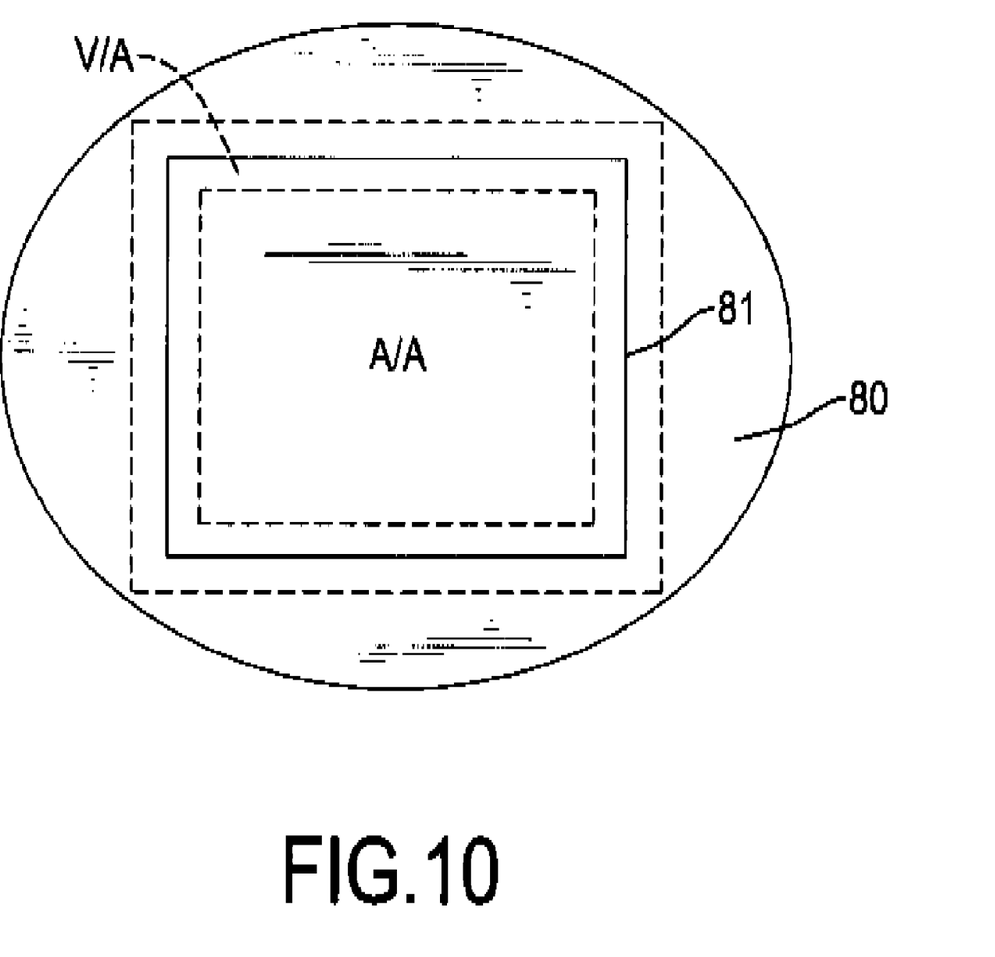
FIG. 10 is a schematic view showing how a conventional liquid crystal panel.

In accord with the above description, the difference between the V/A and the A/A of the liquid crystal panel can be understood. Even though the V/A and the A/A do not differ much in structure, there are some problems when the liquid crystal panel is used in products. With reference to FIG. 10, a liquid crystal product has a housing (80). One surface of the housing (80) has a display window (81) in which a liquid crystal panel is mounted. If the display window (81) is larger than the A/A of the liquid crystal panel, partial V/A surrounding the A/A can be seen. According to the foregoing description of FIG. 8, the A/A and the V/A have different reflective properties for external light, i.e. the V/A does not reflect external light at all. Therefore, when the liquid crystal panel is not active, the A/A and the V/A have distinct background colors that results in an unpleasant visual effect for consumers

SUMMARY OF THE INVENTION

As discussed above, the active area (A/A) and the viewing area (V/A) of a liquid crystal panel may cause unpleasant visual effects because they have different background colors. Therefore, a solution to overcome the drawback is necessary.

An objective of the invention is to provide a liquid crystal panel with a uniform background color by making the A/A and the V/A of the liquid crystal panel have the same or similar background color. Therefore, a user would not have any unpleasant feeling resulted from the different background colors.

To achieve the objective, a primary technical means is to form a plurality of windows on the BM within the V/A, so that the reflective properties in response to external light can match with the reflective properties of the A/A. As a result, both the A/A and the V/A present a uniform background color.

A display screen of the liquid crystal panel has an A/A and a V/A. The liquid crystal panel comprising:

a first substrate having an inner side;

a second substrate having an inner side opposite to the first substrate and being separated from the first substrate to form a gap in which liquid crystal is filled;

a reflective layer formed on the inner side of the first substrate;

a color filter layer and a black matrix formed on an inner side of the second substrate;

wherein the color filter is composed of a plurality of color units of different colors alternately disposed, and the color units in the active area are defined as pixel units;

a plurality of windows is formed on the black matrix, and each window corresponds to one of the color units in the viewing area; and because of forming the window on the black matrix in the viewing area of the liquid crystal panel, a reflecting condition of the viewing area matches with that of the active area, and the active area and the viewing area have a uniform background color.

A plurality of openings is formed on the reflective layer. Each opening corresponds to one pixel unit in the A/A. Therefore, a backlight can pass through the first substrate for providing auxiliary light. Thus, the liquid crystal panel is formed as a transflective liquid crystal panel.

The reflective layer can be a transflective metal layer, and part of backlight can pass through the first substrate for providing auxiliary light.

The C/F layer consists of multiple colors units of different colors (R, G, B) and the colors units within the A/A are defined as pixel units. The C/F layer is formed with a plurality of first openings and a plurality of second openings respectively for the pixel units in the A/A and the colors unit in the V/A. A plurality of third openings is formed in the BM. Each third opening corresponds to one of the color unit in the V/A and the second opening.

The C/F layer is formed with a first hole for each pixel unit in the A/A to increase the reflection rate for external light, and thus the brightness can be increased. The second openings formed on the C/F and the third openings formed on the BM for each color unit in the V/A are used to make the reflective area of each color unit in the V/A the same as or similar to that of each pixel unit in the A/A. Therefore, the liquid crystal panel has a uniform background color.

The reflective layer can be formed on an inner surface of the first substrate. The C/F layer and the BM are formed on an inner surface of the second substrate. In another embodiment, the reflective layer, the C/F, and the BM are all formed on the inner surface of the first substrate.

DETAILED DESCRIPTION OF THE PREFERRED EMBODIMENT

Figure 1:
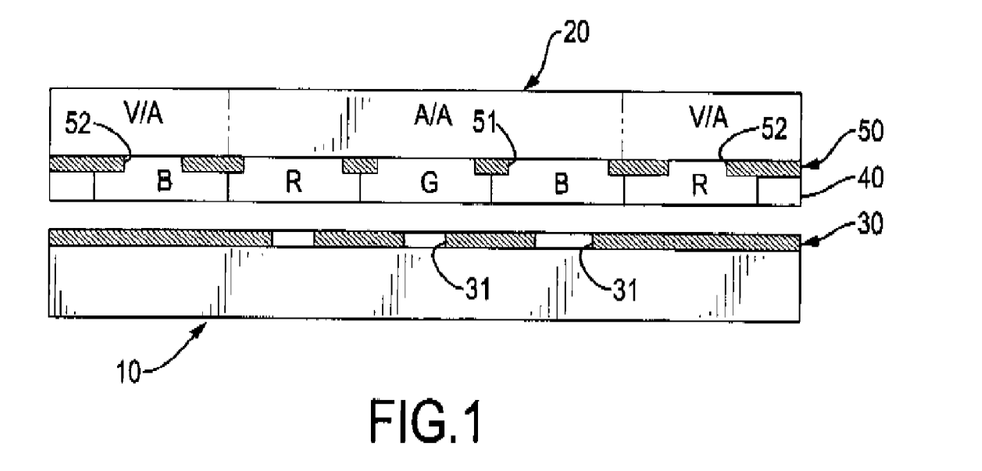
FIG. 1 is a cross-sectional view of the first embodiment of the invention.

The disclosed technique of producing a uniform background color for a liquid crystal panel can be applied to both transflective and reflective liquid crystal panels. With reference to FIG. 1, a cross-sectional view of the transflective liquid crystal panel of the present invention is depicted. A display screen of the liquid crystal panel is defined with an active area (A/A) and a viewing area (V/A).

The liquid crystal panel comprises a first substrate (10) and a second substrate (20).

An inner surface of the first substrate (10) is formed with a reflective layer (30) made of metal material. The reflective layer (30) can be a reflective metal layer or a transflective metal layer. In this embodiment, the reflective layer (30) is a reflective metal layer. An opening (31) is formed in the reflective layer (30) for each pixel unit within the A/A. Light from a backlight source can pass through the openings (31) to provide auxiliary lighting when environmental light is insufficient. If the reflective layer (30) is a transflective metal layer, no opening (31) is needed and the light from the backlight source can pass through the transflective metal layer as the auxiliary light source.

An inner surface of the second substrate (20) facing the first substrate (10) is formed with a color filter (C/F) layer (40) and a black matrix (BM) (50).

The C/F layer (40) consists of alternately disposed color units of different colors (R, G, B). The color units in the A/A are defined as pixel units.

Figure 2:
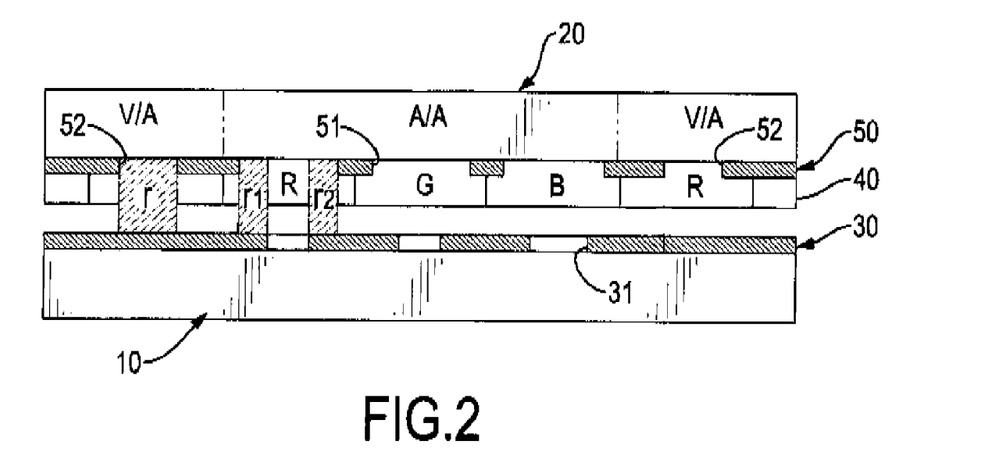
FIG. 2 is another cross-sectional view of the first embodiment showing a reflective area.

A plurality of first windows (51) are formed on the BM (50), wherein each first window (51) corresponds to one pixel unit in the A/A. Light from external environment can radiate into the first substrate (10) through the first windows (51), and is reflected to external environment by the reflective layer (30) also through the first windows (51). When the light is provided by the backlight source, the backlight emits through the opening (31) on the reflective layer (30) and the first windows (51) on the BM (50). The first windows (51) of the BM (50) is the basic design for the current existing liquid crystal panels. According to the invention, a plurality of second windows (52) are formed on the BM (50) for each color unit in the V/A. The light from external environment also enters through the second windows (52). The light is projected through the C/F layer (40) onto the reflective layer (30), and then is reflected by the reflective layer (30) to external environment through the C/F layer (40) and the second windows (52). Such a design achieves the objective that the reflecting condition of each color unit in the V/A is the same as or similar to the reflecting condition of each pixel unit in the A/A. With reference to FIG. 2, a reflecting area "r1+r2" formed on the reflective layer (30) corresponding to the first window (51) is the same as the reflecting area "r" formed on the reflective layer (30) corresponding to the second window (52).

Figure 3:
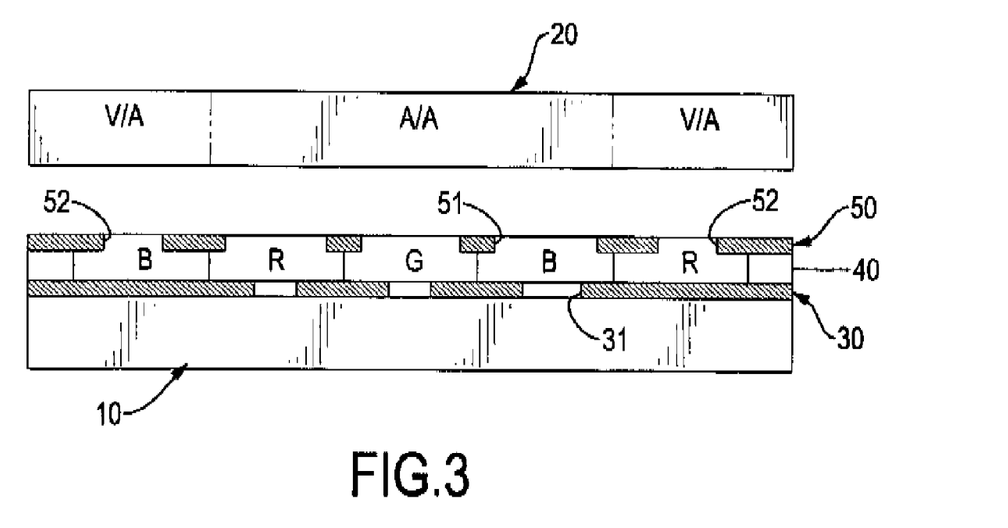
FIG. 3 is a cross-sectional view of another implementation of the first embodiment.

In the above-mentioned embodiment, the reflective layer (30), the C/F layer (40), and the BM (50) can be all formed on the first substrate (10) as shown on FIG. 3.

Figure 4:
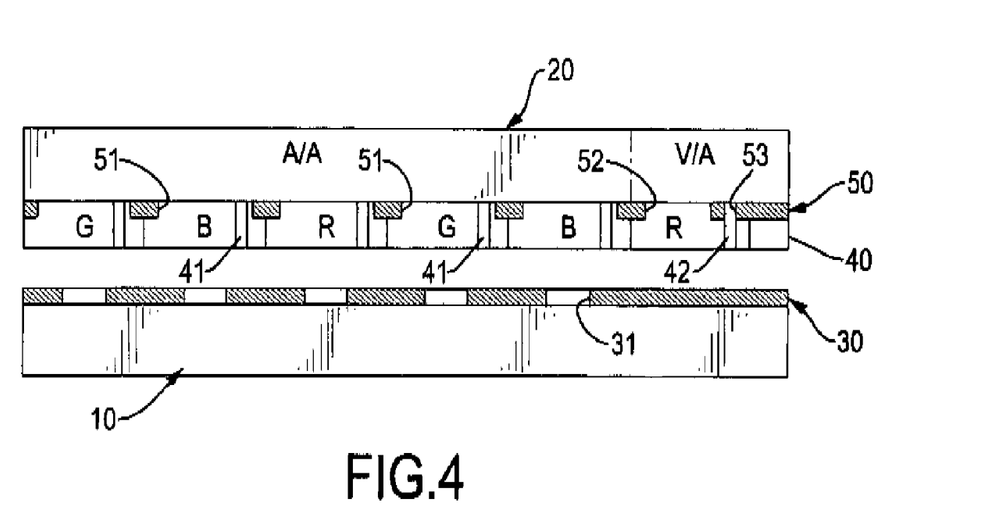
FIG. 4 is a cross-sectional view of the second embodiment of the invention.
Figure 5:
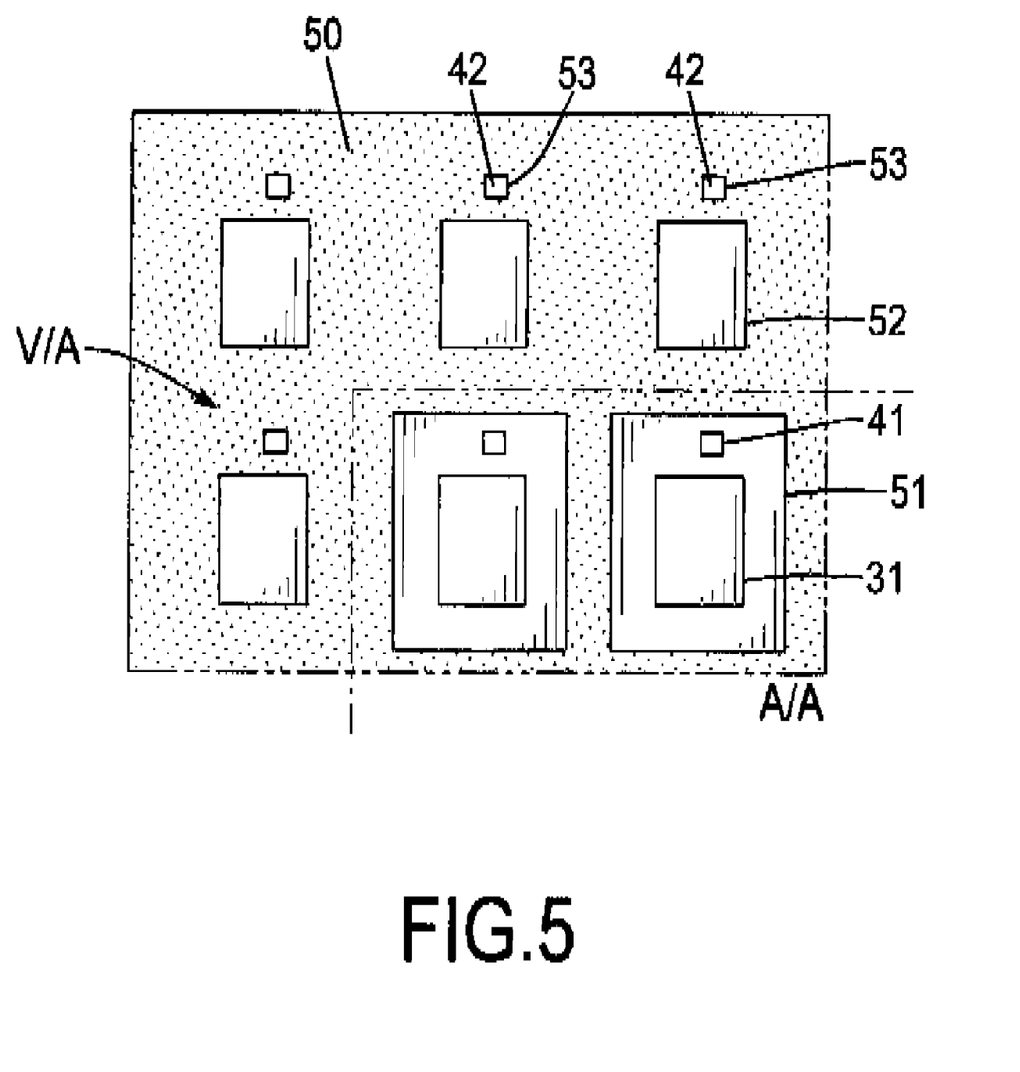
FIG. 5 is a planar view of the second embodiment.

With reference to FIGS. 4 and 5, another embodiment of the invention has similar structure to the previous embodiment. The C/F layer (40) on the second substrate (20) is formed with a first hole (41) corresponding to each pixel unit in the A/A. The C/F layer (40) on the second substrate (20) is formed with a second hole (42) corresponding to each pixel unit in the V/A. Moreover, the BM (50) is formed with a third hole (53) for each color unit in the V/A. The third hole (53) corresponds to the second hole (42) in the C/F layer (40) in the V/A. An internal width ratio of the first, second, third holes (41)(42)(53) to the first and second windows is about 5%~20%.

Because the C/F layer (40) is formed with the first hole (41) for each pixel unit in the A/A, the light from external environment can enter and can be reflected without passing through the C/F layer (40). Therefore, the brightness of the pixel units can be increased. Because the C/F layer (40) and the BM (50) are formed with the second/third hole (42)(53) for each color unit in the V/A, the reflecting area of each color unit in the V/A is the same as or similar to the reflecting area of each pixel unit in the A/A. Therefore, the objective of a uniform background color is achieved.

Each pixel consists of red, green, and blue pixel units. The different colors have different wavelengths. To mix the colors appropriately, the holes (41)(42) for the pixel units and color units of different colors are located at different positions and the hole sizes may be different.

Figure 6:
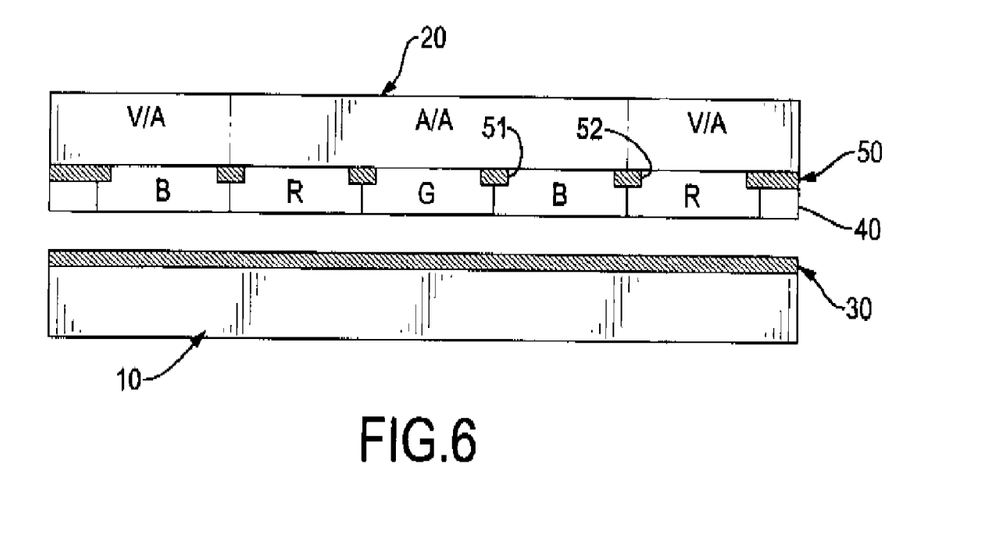
FIG. 6 is a cross-sectional view of the third embodiment of the invention.

With reference to FIG. 6, the present invention is applied to a reflective liquid crystal panel. The reflective liquid crystal panel comprises a first substrate (10) and a second substrate (20).

A surface of the first substrate (10) is formed with a reflective layer (30) made of metal material without any opening. Therefore, the reflective liquid crystal panel completely relies on light from an external lighting source.

A surface of the second substrate (20) facing the first substrate (10) is formed with a color filter (C/F) layer (40) and a black matrix (BM) (50).

The C/F layer 40 consists of alternately disposed color units of different colors (R, G, B). The color units in the A/A are defined as pixel units.

A plurality of first windows (51) are formed on the BM (50). Each first window (51) corresponds to each pixel unit in the A/A. Light from external environment can radiate into the first substrate (10) through the first windows (51), and is reflected to external environment by the reflective layer (30) also through the first windows (51). A plurality of second windows (52) is formed in the BM (50). Each second window (52) corresponds to each color unit in the V/A. Based on the foregoing structure, the reflecting condition of the color units in the V/A is the same as or similar to that of the pixel units in the A/A.

Figure 7:
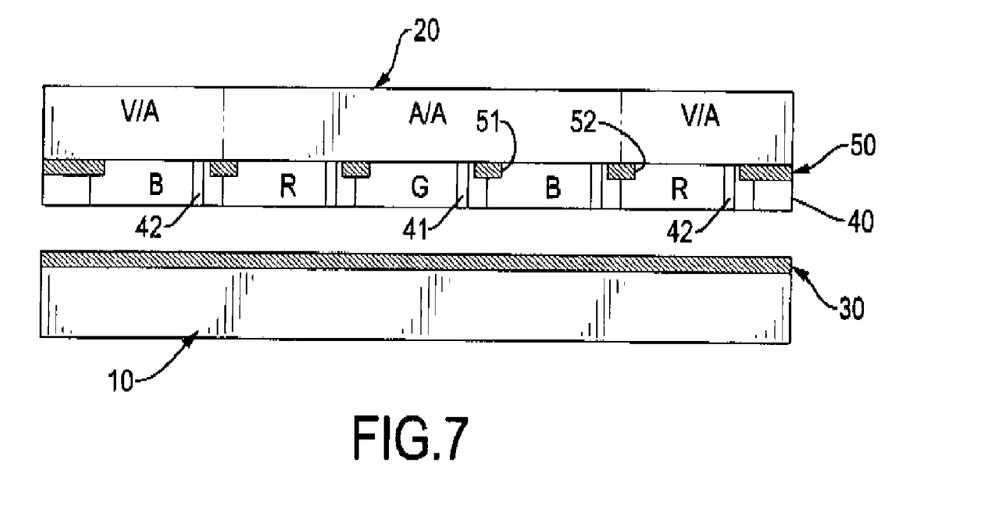
FIG. 7 is a cross-sectional view of the fourth embodiment of the invention.

With reference to FIG. 7, another embodiment of the invention is used in a reflective liquid crystal panel. The structure of the reflective liquid crystal panel is similar to the previous embodiment. The C/F layer (40) on the second substrate (20) is formed with a first hole (41) corresponding to each pixel unit in the A/A. The C/F layer (40) on the second substrate (20) is formed with a second hole (42) corresponding to each color unit in the V/A. An internal width ratio of the holes (41)(42) to the first and second windows (51)(52) is about 5%~20%.

The purpose of forming the first holes (41) in the C/F layer (40) within the A/A is the same as embodiments of FIGS. 3 and 4. Light from external environment can enter and be reflected without passing through the C/F layer (40). Therefore, the brightness of the pixel units can be increased. The second hole (42) at each color unit in the V/A of the C/F layer (40) makes the reflecting area of each color unit in the V/A the same as or similar to that of each pixel unit in the A/A. The brightness of V/A and A/A is thus the same or similar. Therefore, the objective of a uniform background color for the liquid crystal panel.

The reflective layer (30), the C/F layer (40), and the BM (50) in the embodiments of FIGS. 6 and 7 can all be formed on the first substrate (10).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A liquid crystal panel with a uniform background color having an active area and a viewing area, the liquid crystal panel comprising:
    a first substrate having an inner surface;
    a second substrate having an inner surface opposite to the first substrate and being separated from the first substrate to form a gap in which liquid crystal is filled;
    a reflective layer formed on the inner surface of the first substrate;
    a color filter layer and a black matrix formed on the inner surface of the second substrate, wherein the color filter is composed of a plurality of color units of different colors alternately disposed, and the color units in the active area are defined as pixel units;
    a plurality of windows formed on the black matrix and each window corresponding to one of the color units in the viewing area;
    a plurality of first holes formed on the color filter and each first hole corresponding to each pixel unit in the active area;
    a plurality of second holes formed on the color filter and each second hole corresponding to each color unit in the viewing area;
    a plurality of third holes formed on the black matrix and each third hole corresponding to each color unit in the viewing area and the second hole on the color filter; and
    because of forming the window on the black matrix in the viewing area of the liquid crystal panel, a reflecting condition of the viewing area matches with that of the active area, and the active area and the viewing area have a uniform background color.

2. The liquid crystal panel as claimed in claim 1, wherein the first and second holes of different sizes are formed at different positions for the color units and pixel units of different colors on the color filter.

3. The liquid crystal panel as claimed in claim 2, wherein an opening is formed on the reflective layer for each pixel unit in the active area so that a backlight is able to pass through the first substrate to provide auxiliary light, whereby the liquid crystal panel is formed as a transflective liquid crystal panel.

4. The liquid crystal panel as claimed in claim 2, wherein the reflective layer is a transflective metal layer, and part of a backlight is able to pass through the fist substrate and for providing auxiliary light, whereby the liquid crystal panel is formed as a transflective liquid crystal panel.

5. The liquid crystal panel as claimed in claim 1, wherein an opening is formed on the reflective layer for each pixel unit in the active area so that a backlight is able to pass through the first substrate to provide auxiliary light, whereby the liquid crystal panel is formed as a transflective liquid crystal panel.

6. The liquid crystal panel as claimed in claim 1, wherein the reflective layer is a transflective metal layer, and part of a backlight is able to pass through the fist substrate for providing auxiliary light, whereby the liquid crystal panel is formed as a transflective liquid crystal panel.

7. The liquid crystal panel as claimed in claim 1, wherein an internal width ratio of the first, second and third holes to the windows on the black matrix is in a range of 5%~20%.

8. A liquid crystal panel with a uniform background color having an active area and a viewing area, the liquid crystal panel comprising:
    a first substrate having an inner surface;
    a second substrate having an inner surface opposite to the first substrate and being separated from the first substrate to form a gap in which liquid crystal is filled;
    a reflective layer formed on the inner surface of the first substrate;
    a color filter layer and a black matrix formed on the inner surface of the first substrate, wherein the color filter is composed of a plurality of color units of different colors alternately disposed, and the color units in the active area are defined as pixel units;
    a plurality of windows formed on the black matrix and each window corresponding to one of the color units in the viewing area;
    a plurality of first holes formed on the color filter and each first hole corresponding to each pixel unit in the active area;
    a plurality of second holes formed on the color filter and each second hole corresponding to each color unit in the viewing area;
    a plurality of third holes formed on the black matrix and each third hole corresponding to each color unit in the viewing area and the second hole on the color filter; and
    because of forming the window on the black matrix in the viewing area of the liquid crystal panel, a reflecting condition of the viewing area matches with that of the active area, and the active area and the viewing area have a uniform background color.

9. The liquid crystal panel as claimed in claim 8, wherein the first and second holes of different sizes are formed at different positions for the color units and pixel units of different colors on the color filter.

10. The liquid crystal panel as claimed in claim 9, wherein an opening is formed on the reflective layer for each pixel unit in the active area so that a backlight is able to pass through the first substrate to provide auxiliary light, whereby the liquid crystal panel is formed as a transflective liquid crystal panel.

11. The liquid crystal panel as claimed in claim 9, wherein the reflective layer is a transflective metal layer, and part of a backlight is able to pass through the fist substrate and for providing auxiliary light, whereby the liquid crystal panel is formed as a transflective liquid crystal panel.

12. The liquid crystal panel as claimed in claim 8, wherein an opening is formed on the reflective layer for each pixel unit in the active area so that a backlight is able to pass through the first substrate to provide auxiliary light, whereby the liquid crystal panel is formed as a transflective liquid crystal panel.

13. The liquid crystal panel as claimed in claim 8, wherein the reflective layer is a transflective metal layer, and part of a backlight is able to pass through the fist substrate for providing auxiliary light, whereby the liquid crystal panel is formed as a transflective liquid crystal panel.

14. The liquid crystal panel as claimed in claim 8, wherein an internal width ratio of the first, second and third holes to the windows on the black matrix is in a range of 5%~20%.

* * * * *